March 14, 1939.    R. J. BLUME    2,150,597
VISIBILITY INDICATOR
Filed May 15, 1937

Inventor:
Ralph J. Blume
By Maurus S. Cayn
Atty.

Patented Mar. 14, 1939

2,150,597

UNITED STATES PATENT OFFICE 2,150,597

VISIBILITY INDICATOR

Ralph J. Blume, Fort Wayne, Ind.

Application May 15, 1937, Serial No. 142,756

2 Claims. (Cl. 88—23)

This invention relates generally to devices for gauging the proper illumination, and more particularly to a device of the character described for gauging the proper amount of light that one may require or need for safe use before the eyes are put to any extended use.

It is well known that it is possible for the eyes to adapt themselves to greatly varying amounts of illumination. However, when the illumination is below the level of distinct visibility, which varies with individual eyes, eye strain is experienced, and if continued for long periods of time, real damage of a lasting nature may result.

In view of this fact, illumination engineers have set up certain light standards, with the result that great improvements have been brought about in lighting equipment. For the individual, however, light adaptation is purely an individual standard due to the light absorbing qualities of his eyes and necessarily must be adjusted to the individual's own need.

It is also well known that in order to read in comfort without eye strain and without damage to the eyes, it is necessary that the light be considerably above the visibility level, which would just permit you to read with comfort. It is, therefore, the main object of this invention to provide an illumination gauge whereby it will be possible to readily determine the amount of light one requires, so that he may have an amount of light safely above the visibility level.

Another object of this invention is to provide a device of the character described having novel and improved means associated therewith for permitting an individual to effectively judge whether or not he has proper and sufficient illumination before he assumes the continued use of his eyes.

A further object of this invention is to provide a device of the character described which will be simple in construction, assembly and operation, which may be produced along lines susceptible to low cost manufacture, and which will, at the same time, be highly efficient for carrying out the purposes for which it is designed.

With the foregoing and other objects in view, which will appear as the description proceeds, the invention consists in certain novel features of construction, arrangement and combination of parts hereinafter more fully described, illustrated in the accompanying drawing, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawing preferred embodiments thereof, from an inspection of which, when considered in connection with the following description, my invention, its mode of construction, assembly and operation, and many of its advantages should be readily understood and appreciated.

Referring to the drawing in which the same characters of reference are employed to indicate corresponding or similar parts throughout the the several figures of the drawing.

Figure 1:
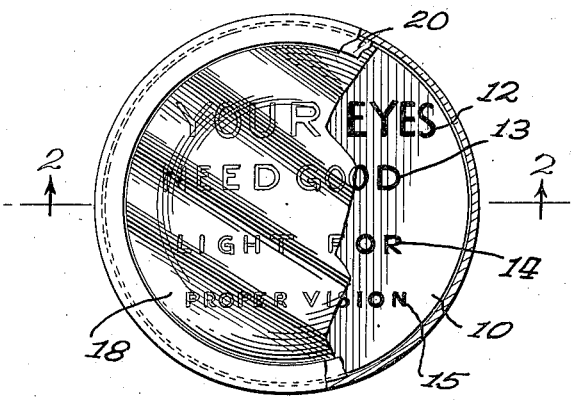
Fig. 1 is a top plan view of an illumination gauge constructed in accordance with my invention, with parts thereof being broken away to more clearly illustrate the construction thereof.
Figure 2:
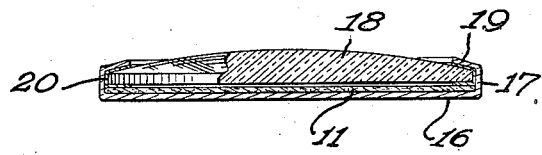
Fig. 2 is a sectional view taken substantially on line 2—2 of Fig. 1.

There are three essential features which enter into the act of seeing, the human eye, the amount of illumination, and the size and color of the object to be viewed. In my construction, therefore, I have provided a gauge which includes a surface 10 provided on any suitable background, such for example, as a sheet of paper 11, cardboard or the like, upon which surface is provided a plurality of lines of printed matter, which lines are designated by the reference characters 12, 13, 14 and 15, said characters decreasing in size from top to bottom as viewed in Fig. 1. The paper 11 is disposed within a container 16 formed of suitable material such as metal or the like, said container having an annular, upstanding flange 17. The member 11 is adapted to be disposed and to rest on the bottom wall of the container 16 with the printed matter appearing thereon facing upwardly, so that said printed matter may be readily viewed when the device is disposed or laid over it on a table or the like.

Disposed within the container 16 is a lens 18 which may be formed of suitable material such as glass or the like, which lens may be either transparent or translucent, and which may be either of a curved, flat or concave structure. The member 18 is permanently and fixedly secured in place within the container 16 by folding the upper free edge of the annular flange 17 inwardly, as shown at 19, over the outer edge of the lens 18. If desired, an annular ring 20 of suitable material, such as brass or the like, may be interposed between the lens 18 and the casing 16 as shown in the drawing.

The lens has the property or quality of absorbing a certain predetermined amount of light, so that the printed matter when viewed through the lens 18, will be distinctly visible only when the amount of illumination is of such a degree as to be clearly above the level of visibility, thereby establishing a safety level for the individual before he puts his eyes to any extended use. By providing printed matter of various sizes, the device readily adapts itself for use for individuals whose eyes have different light absorbing qualities.

In operation, the device may be placed on a table or the like, and when observed or viewed by the individual, he will be in a position to readily determine whether or not the amount of light is safe, depending upon the use to which his eyes are to be put. Thus, for very severe and prolonged tasks, the amount of illumination required should be that which would permit distinct visibility of the bottom line of printed matter 15. For moderately critical and prolonged tasks such as ordinary reading or clerical work, the amount of light to be used should be that which would make clearly distinct and visible the second line 14 of the printed matter. For ordinary reading, when not prolonged, the line of printed matter indicated by the reference character 13 may be used as a gauge. For casual seeing and what may be termed the danger zone for severe visual tasks, the upper line 12 of the printed matter may be used as a gauge.

From the above, it will be readily apparent that I have provided a very simple device which may be readily assembled and which may be manufactured at a low cost, but which will be highly useful in properly gauging the degree of illumination necessary for performing various tasks.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claims.

What I claim and desire to secure by Letters Patent of the United States is:

1. An illumination gauge of the character described for individual use, comprising a surface having a plurality of lines of printed matter provided thereon, the size of the printed matter in each line being different from the size of the printed matter in the other lines, a light absorbing medium disposed over said printed matter and through which said printed matter may be viewed, and a casing closed at one end and open at the upper end, within which said surface bearing the printed matter and the medium may be disposed with the medium being arranged in superimposed position over said printed matter.

2. An illumination gauge of the character described for individual use, comprising a surface having a plurality of lines of printed matter provided thereon, the size of the printed matter in each line being different from the size of the printed matter in the other lines, a light absorbing medium disposed over said printed matter and through which said printed matter may be viewed, and a casing closed at one end and open at the upper end, within which said surface bearing the printed matter and the medium may be disposed with the medium being arranged in superimposed position over said printed matter, said casing having an annular upstanding flange, the upper portion of which is adapted to be turned inwardly for securely locking the surface bearing the printed matter and medium in assembled operative position.

RALPH J. BLUME.